3,344,088
CATALYTIC PROCESS FOR POLYMERIZING CYCLIC ETHERS

Donald B. Miller, Ponca City, Okla., assignor to Continental Oil Company, Ponca City, Okla., a corporation of Delaware
No Drawing. Filed May 21, 1964, Ser. No. 369,297
29 Claims. (Cl. 260—2)

ABSTRACT OF THE DISCLOSURE

Cyclic ethers having at least three carbon atoms in the ether ring, such as tetrahydrofuran, are polymerized in the presence of silicon tetrafluoride at a temperature below about 50° C., preferably in the presence of not more than about 5 weight parts of a different cyclic ether having at least three carbon atoms in the ether ring, such as trimethylene oxide, per 100 weight parts of feed ether. If trimethylene oxide is the feed ether, then tetrahydrofuran could serve as the promoter ether. The promoter ether apparently enters the polymerization and thus the predominating ether is termed the feed ether and the minor amount of ether is termed the promoter ether. As little as 0.002 weight part of promoter ether in disclosed as sufficient to initiate the polymerization; however, with sufficient time the silicon tetrafluoride will promote the reaction in the absence of a promoter.

---

This invention relates to the polymerization of saturated cyclic ethers such as tetramethylene oxide and to polymers therefrom.

An object of the invention is a process for polymerizing saturated cyclic ethers.

Another object of the invention is a process for preparing solid polymers of saturated cyclic ethers.

A further object of the invention is a process for polymerizing oxetanes.

A particular object of the invention is a process for polymerizing tetrahydrofurans, and especially tetramethylene oxide.

Yet another object of the invention is a solid polymer derivable from saturated cyclic ethers such as, oxetanes and tertahydrofurans.

Other objects of the invention will become apparent from the detailed description thereof.

It has been discovered that a solid polymer product is obtained when an oxetane is contacted with silicon fluoride catalyst for a suitable time, at a temperature below about 50° C.

It has also been discovered that polymers can be produced from saturated cyclic ethers having at least three carbon atoms in the ether ring, by contacting the ether with a silicon fluoride catalyst for a suitable time at a temperature of not more than about 50° C., and in the presence of a promoter saturated cyclic ether having not more than three carbon atoms in the ether ring.

A preferred feed saturated cyclic ether is tetramethylene oxide and preferred promoter ethers are ethylene oxide and bischloromethyloxetane.

A liquid polymer or a solid polymer can be obtained by varying the amount of promoter ether present in the polymerization zone. By operating with a minor amount of promoter epoxyalkane or oxetane, a solid polymer is produced from tetrahydrofuran, which polymer has an inherent viscosity of at least about 1, has a softening point below about 50° C., has rubbery properties above about 50° C., and can be formed into a flexible, strong, oriented film.

A solid polymer having an inherent viscosity of at least about 1, a non-crystalline character, and exhibiting viscous flow when subjected to prolonged stresses, but exhibiting elastic recovery from sudden stresses, is derivable from tetrahydrofuran and oxetane when the oxetane is present in the polymeritation zone in amounts of about 5–25 parts by weight per 100 parts of said furan.

OXETANE POLYMER

In one embodiment of the invention an oxetane, or oxetanes, is contacted with silicon fluoride catalyst for a suitable time at a temperature below about 50° C., and a solid polymer product is obtained. The oxetane may be trimethylene oxide, or a substituted trimethylene oxide, particularly alkyl oxetanes. Illustrative suitable oxetanes are trimethylene oxide, methyloxetane and bischloromethyloxetane.

The oxetane feed and at least a catalytic amount of silicon fluoride are contacted at a temperature below about 50° C. (122° F.) for a time such that a solid polymer product is produced. Amounts of silicon fluoride in excess of that needed to carry out the polymerization at the particular temperature and time may be used without adverse effect on the polymer. Higher molecular weight polymers are obtained by operating at lower temperatures. A temperature on the order of 0° C. (32° F.) is desirable, and the temperature may approach or even be below about −50° C. (−58° F.).

The oxetanes exhibit an unusual property in that the polymerization will proceed even though the oxetane is in the solid state i.e., operation below the freezing point of the feed oxetane. However, if lower temperature liquid state polymerization is desired, the process may be carried out by the use of a liquid solvent for the oxetane feed. Any solvent having the proper freezing point and which does not participate in the polymerization reaction may be used.

PROMOTER POLYMERIZATION

The promoted polymerization process utilizes as the feed one or more saturated cyclic ethers having at least three carbon atoms in the ether ring. Illustrative groups of suitable feed ethers are the oxetanes, the tetrahydrofurans, and the tetrahydropyrans. The oxetanes include trimethylene oxide (also known as oxetane) and the substituted trimethylene oxides, particularly the aliphatic substituted, such as methyloxetane and bischloromethyloxetane. The tetrahydrofurans include tetramethylene oxide (also known as tetrahydrofuran) and the substituted tetramethylene oxides, particularly the alkyl and alkylene substituted oxides, e.g., 1,4-epoxycyclohexane. The tetrahydropyrans include pentamethylene oxide (also known as tetrahydropyran) and the substituted oxides, particularly the alkyl substituted oxides. Trimethylene oxide and tetramethylene oxides are preferred feeds to the promoted process.

The polymerization of the defined feed ether is promoted by a saturated cyclic ether having not more than three carbon atoms in the ether ring. It is to be understood that the polymerization process may be carried out in the presence of large amounts of the promoter; it is thought that the promoter ether participates to some extent in the polymerization, and is present in the product polymer. This supposition is based upon the variation in properties of the polymer product, with variation in the amount of promoter ether present in the polymerization zone. For convenience in description, the term "promoter ether" is used regardless of the amount of promoter ether present.

Two particularly effective classes of promoter ethers are the epoxyalkanes and the oxetanes. It is to be understood that when an oxetane is the feed ether, the promoter ether will be a different type of cyclic ether.

Any epoxyalkane, i.e., any saturated hydrocarbon including a

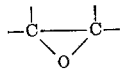

group, which is a gas or liquid at polymerization conditions may be used as promoter. When a solvent is present, a normally solid epoxyalkane may be used as the promoter. Because the polymerization is normally terminated before all of the feed ether has been polymerized, it may be possible to utilize a promoter ether which is normally solid at polymerization conditions, as the feed ether can act as a solvent for the promoter ether.

Illustrative particularly suitable epoxyalkanes are: ethylene oxide, propylene oxide (1,2-epoxy propane); isobutylene oxide (1,2 epoxy-2-methyl-propane); 1,2 dimethyl-ethylene oxide; 1-methyl-2-ethyl-ethylene oxide; and isopropyl ethylene oxide.

The promoter oxetanes may be any one of the aforedefined feed oxetanes.

The promoter ether is effective in very small amounts in the case of ethylene oxide and propylene oxide; as little as 0.002 weight percent based on feed ether will result in polymerization taking place in the presence of silicon fluoride. Higher yields of polymer are obtained by using more promoter ether. As the amount of promoter is increased, the character of the polymer changes toward lower molecular weights and eventually clear liquid polymers are produced. Particularly with the epoxyalkane promoter ethers, it is preferred that in the charge to the polymerization zone, the feed ether predominates in amount over the promoter ether; and for the preparation of high molecular weight solid polymers not more than about one part by weight of promoter ether be present per four parts by weight of feed ether. In the case of epoxyalkane promoter ether, particularly preferred polymers are obtained by using a minor amount of promoter ether e.g., about five parts or less by weight of promoter ether per 100 parts by weight of feed ether.

In the case of the oxetane promoter ethers, it is preferred that not more than about one part by weight of the oxetane promoter ether be present per part of feed ether i.e., the weight ratio of promoter ether present to feed ether present is not more than one.

When the feed ether is a tetrahydrofuran, and the promoter is ethylene oxide, it is preferred that not more than about five parts by weight of the oxide be present per 100 parts of the furan. Also, with this feed furan, when the promoter ether is propylene oxide, it is preferred that not more than about three parts by weight of oxide be present per 100 parts of feed furan.

The polymerization process is carried out at a temperature of not more than about 50° C. (122° F.). In some instances, higher temperatures may be used. Higher molecular weight polymers are obtained as the polymerization temperature is decreased, and it is desirable to operate at a temperature below about 25° C. (77° F.) and preferably below about 0° C. (32° F.). The process may be carried out at any temperature which will produce polymerization, and as it has been mentioned before, the oxetanes undergo solid state polymerization. However, for operation at low temperatures, on the order of —50° C. (—58° F.) it is desirable to operate in the presence of an inert liquid solvent for an ether which has a melting point above operating temperature; or to operate with an excess of liquid feed ether, with the feed ether providing a liquid state system.

The polymerization time is affected by operating temperatures, with the longer times being associated with the lower temperatures. However, molecular weight is also affected by reaction time to some extent with the higher molecular weights being associated with longer times. The polymerization reaction is carried out for the time necessary to obtain polymer products, which time may be readily determined for each combination of polymerizing conditions. As will be seen from the working examples set forth hereinafter, the polymerization process is very simply carried out. The feed ether, the promoter ether, the solvent, if any, and the silicon fluoride are present together, thoroughly intermingled, in a suitable polymerization zone, at the particular temperature until the polymer has been formed.

The tetrahydrofuran polymers produced with minor amounts of epoxyalkane are tough, white, at least partially crystalline solids which melt in the range of 40° to 60° C. to form clear, viscous, sticky liquids. This is true even though the inherent viscosity of the polymer is somewhat less than one, owing to polymerization temperature having been above about 0° C. With these minor amounts of epoxyalkane promoter, temperatures below about 0° C. result in solid polymers having an inherent viscosity of at least about one, and normally on the order of two. It has been observed that the higher molecular weight polymers, i.e., inherent viscosity of at least about one, form rubbery solids above their crystalline melting point, usually about 50° C.; these rubbery polymers do not flow, even at 100° C. Also; they have the capability of being formed into clear, colorless films, which films may be oriented by being stretched at a temperature below the crystalline melting point. The oriented films are strong and flexible.

The high molecular weight polymers obtained with tetrahydrofuran and small amounts of oxetane, such as, bischloromethyloxetane, are also white, tough solids at ordinary temperatures, and rubbery solids above the crystalline melting point. However, surprisingly, high molecular weight tetrahydrofuran polymers made in the presence of larger amounts of oxetane, such as bischloromethyloxetane, appear to be non-crystalline when recovered from the polymerization zone; these partially crystallize on standing at room temperature. In the non-crystalline condition, these polymers behave like "bouncing putty." In the non-crystalline condition, the polymers display viscous flow when subjected to prolonged stresses, but when subjected to sudden stresses, the non-crystalline polymers show elastic recovery.

ILLUSTRATIONS

The processes of the invention and the polymers of the invention are illustrated by the following examples. It is to be understood that these examples are not limiting with respect to the scope of the invention and merely set forth various modes of carrying out the invention and producing the polymers of the invention.

Efforts to polymerize tetramethylene oxide, also known as the compound tetrahydrofuran—THF—with silicon fluoride catalyst in the absence of ether promoter were unsuccessful.

Series I—Examples 1–8

Tetramethylene oxide, THF, (18 g.) was placed in dry bottles which were then capped with rubber septa. Then the bottles were partially evacuated and ethylene oxide, EO, was measured and added with a syringe, or by weight, when half a gram or more EO was used. Similarly, the $SiF_4$ was measured and transferred to the polymerization bottle with a syringe. After several days at 25° C. the mixtures in the bottles ranged from mobile to extremely viscous liquids. Sufficient THF was then added to the polymerizates to make them mobile, and the polymers were then isolated by precipitation from rapidly stirred ice water. The polymers were then dried in vacuo several days at 50–60°. After cooling to 25°, the polymers resembled rubber, but after some hours or days they crystallized to tough, stiff solids. Alternatively, cooling the polymers to 0 to 10° caused crystallization in a few minutes. The effects of varying amounts of ethylene oxide is shown in the Table I. These polymers having an inherent viscosity of less than 1 were white, tough, partially crystalline solids melting in the range of 40°–60°; the melts were clear, viscous and sticky liquids.

TABLE I

| Example | Ml. SiF₄ | Ml. EO | Weight Polymer, g. | Inherent Viscosity |
|---|---|---|---|---|
| 1 | 250 | 0.3 | 0.7 | 0.94 |
| 2 | 200 | 1.0 | 1.1 | 0.91 |
| 3 | 200 | 3.0 | 2.6 | 0.89 |
| 4 | 200 | 10 | 5.9 | 0.84 |
| 5 | 200 | 30 | 10.1 | 0.80 |
| 6 | 200 | 100 | 12.0 | 0.71 |
| 7 | 100 | 100 | 9.2 | 0.55 |
| 8 | 100 | 0.6 | 11.9 | 0.40 |

Series II—Examples 9–14

The following polymerizations were performed using the procedure of Examples 1–8 except that higher levels of ethylene oxide were employed in conjunction with specified amounts of THF.

TABLE II

| Example | Weight EO, g. | Weight THF, g. | Ml. SiF₄ | Weight Polymer, g. | Inherent Viscosity |
|---|---|---|---|---|---|
| 9 | 3.0 | 36.0 | 10 | 24.0 | 0.48 |
| 10 | 11.3 | 36.0 | 10 | 24.3 | 0.42 |
| 11 | 9.6 | 8.9 | 10 | 14.7 | 0.38 |
| 12 | 18.7 | 3.7 | 10 | 10.1 | 0.19 |
| 13 | 21.4 | 0.9 | 10 | 4.4 | 0.08 |
| 14 | 21.7 | 0.2 | 10 | 2.3 | 0.03 |

The polymers from Examples 9 and 10 were isolated by precipitation from cold water. The polymers from Examples 11–14 were isolated simply by transferring into an open dish and then drying in vacuo at 50–60° C. The polymer of Example 9 was a semi-solid. The polymers of Examples 10–14 were clear viscous liquids. In all the examples, inherent viscosities were determined in benzene at 25° C., at a concentration of 0.5 g. solute per 100 ml. solvent.

Series III—Examples 20–22

In this Series III, 18 g. of THF was polymerized in the presence of ethylene oxide according to the procedure of Series I, except that the temperature was about 0° to +5° C. and the time was 3 days.

TABLE III

| Example | Ml. SiF₄ | Ml. EO (gas) | Weight Polymer, g. | Inherent Viscosity |
|---|---|---|---|---|
| 20 | 150 | 1.0 | 5.3 | 2.5 |
| 21 | 150 | 10 | 12.7 | 1.8 |
| 22 | 150 | 100 | 16.0 | 1.0 |

These polymers having an inherent viscosity above about 1 are tough white solids at ordinary temperatures. Above their crystalline melting point of about 50° C., the polymers are rubbery; they do not flow, even at 100° C. They may be pressed into clear colorless films which become oriented when stretched below the crystalline melting point; these oriented films are flexible and strong.

Series IV—Examples 15–19

THF was polymerized by SiF₄ in the presence of propylene oxide. Various mixtures of THF and PO were brought together at 25° C. in the absence of moisture and treated with 100 ml. SiF₄ gas. The polymers were isolated by precipitation into cold water.

TABLE IV

| Example | Ml. THF | Ml. PO (liq.) | Weight Polymer, g. | Inherent Viscosity |
|---|---|---|---|---|
| 15 | 20 | 0.2 | 13.6 | 0.61 |
| 16 | 20 | 1.0 | 11.7 | 0.38 |
| 17 | 15 | 5.0 | 12.6 | 0.16 |
| 18 | 10 | 10 | 8.4 | 0.09 |
| 19 | 5 | 10 | 5.1 | 0.07 |

Series V—Examples 23–24

In this Series V, 18 g. of THF was polymerized in the presence of propylene oxide according to the procedure of Series I except that the temperature was about 0° to +5° C. and the time was 12 days.

TABLE V

| Example | Ml SiF₄. | Ml. PO (liq.) | Weight Polymer, g. | Inherent Viscosity |
|---|---|---|---|---|
| 23 | 100 | 0.01 | 6.0 | 0.82 |
| 24 | 100 | 0.10 | 5.5 | 0.79 |

The polymer of Examples 15, 23 and 24 were tough, low melting solids, similar to the low EO usage polymers. The polymer of Example 16 was semi-solid. The polymers of Examples 17–19 were clear, viscous liquids.

Series VI—Examples 25–32

In Series VI THF and bischloromethyloxetane, BCMO, were contacted at a temperature of about 0° C. to +5° C. for a time of 10 days according to the procedure of Series I. These examples range from a very small amount of BCMO present to a small amount of THF present. Results are set forth in Table VI.

TABLE VI

| Example | Ml. SiF₄ | Ml. THF | Ml. BCMO | Weight Polymer, g. | Inherent Viscosity |
|---|---|---|---|---|---|
| 25 | 100 | 20 | 0.01 | 0.9 | 1.44 |
| 26 | 100 | 20 | 0.10 | 2.3 | 1.28 |
| 27 | 100 | 20 | 0.30 | 5.6 | 1.47 |
| 28 | 100 | 20 | 1.0 | 9.6 | 1.28 |
| 29 | 100 | 15 | 5 | 13.0 | 1.36 |
| 30 | 100 | 5 | 5 | 6.8 | 0.71 |
| 31 | 100 | 1 | 5 | 2.4 | 0.34 |
| 32 | 100 | 0.1 | 5 | 1.2 | 0.14 |

The reaction product mixture of Examples 31–32 was a solid. The "BCMO polymer" was recovered by washing the solid reaction product mixture several times with methanol.

The high mol. wt. THF polymers containing small proportions of bischloromethyloxetane (BCMO) (Examples 25, 26) were tough solids at room temperature and rubbery above the crystalline melting point. High mol. wt. polymers containing larger amounts of BCMO (Examples 28 and 29) appeared to be non-crystalline when isolated, but after some days, appeared to partially crystallize. While non-crystalline, these polymers behaved like "bouncing putty." When subjected to prolonged stresses, they displayed viscous flow, but they showed elastic recovery from sudden stresses.

In Examples 31 and 32 the BCMO mix became solid at reaction temperature and solid state polymerization proceeded. In Example 30, it is thought the THF acted as a solvent for the BCMO and this accounts for the marked difference between these examples.

Series VII—Examples 33–35

In this Series BCMO was polymerized alone and in the presence of ethylene oxide —5 ml. (6.3 g.) of BCMO was charged along with 100 ml. of SiF₄.

TABLE VII

| Example | Temp. °C. | Days | Ml. EO | Weight Polymer, g. | Inherent Viscosity |
|---|---|---|---|---|---|
| 33 | 25 | 3 | None | 3.3 | 0.26 |
| 34 | 25 | 3 | 10 | 2.9 | 0.17 |
| 35 | (¹) | 17 | 10 | 5.5 | 0.35 |

¹ Ca 0°.

Example 35 was a solid state polymerization like Examples 31–32.

The BCMO polymers of Examples 31–35 were white powdery solids which melted above 160° C.; films prepared from these polymers were brittle.

Thus having described the invention, what is claimed is:

1. A process for preparing a linear polymer which process comprises contacting a saturated oxetane and silicon fluoride catalyst at a temperature below about 50° C. for a time such that a solid polymer product is produced.

2. A process in accordance with claim 1 wherein said oxetane is trimethylene oxide.

3. A process in accordance with claim 1 wherein said oxetane is bischloromethyloxetane.

4. A process in accordance with claim 1 wherein said temperature is between about 0° C. and about −50° C.

5. A process in accordance with claim 1 wherein a solvent for said oxetane is present.

6. A process for producing a linear polymer from a cyclic ether which process comprises:
   contacting as a feed a saturated cyclic ether having at least 3 carbon atoms in the ether ring;
   with a silicon fluoride catalyst;
   in the presence of a promoter, said promoter being a different saturated cyclic ether having not more than 3 carbon atoms in the ether ring than said feed ether; and
   at a temperature of not more than about 50° C. and for a time such that a polymeric product is produced.

7. A process in accordance with claim 6 wherein said feed ether is a saturated oxetane.

8. A process in accordance with claim 7 wherein said oxetane is trimethylene oxide.

9. A process in accordance with claim 7 wherein said oxetane is bischloromethyloxetane.

10. A process in accordance with claim 6 wherein said feed ether is a tetrahydrofuran.

11. A process in accordance with claim 10 wherein said feed ether is tetramethylene oxide.

12. A process in accordance with claim 6 wherein said feed ether is a tetrahydropyran.

13. A process in accordance with claim 12 wherein said pyran is pentamethylene oxide.

14. A process in accordance with claim 6 wherein said promoter ether is a vic-epoxyalkane containing up to 6 carbon atoms in the alkane portion of the promoter ether.

15. A process in accordance with claim 14 wherein said epoxyalkane is ethylene oxide.

16. A process in accordance with claim 14 wherein said epoxyalkane is propylene oxide.

17. A process in accordance with claim 14 wherein said epoxyalkane is isobutylene oxide.

18. A process in accordance with claim 6 wherein said promoter ether is a saturated oxetane.

19. A process in accordance with claim 18 wherein said oxetane is bischloromethyloxetane.

20. A process in accordance with claim 18 wherein said oxetane is trimethylene oxide.

21. A process in accordance with claim 6 wherein said promoter ether is present in an amount of not more than about 1 part by weight per 4 parts by weight of said feed ether.

22. A process in accordance with claim 6 wherein said promoter ether is a 1,2-epoxyalkane containing up to 6 carbon atoms in the alkane portion of said epoxyalkane and is present in an amount of not more than about 5 parts by weight per 100 parts of said feed ether.

23. A process in accordance with claim 6 wherein said temperature is between about 0° C. and about −50° C.

24. A process in accordance with claim 23 wherein a solvent for said ether is present.

25. A process for producing a solid linear polymer which process comprises:
   contacting a tetrahydrofuran;
   with silicon fluoride catalyst;
   in the presence of a promoter ether selected from the class consisting of a 1,2-epoxyalkane containing up to 6 carbon atoms in the alkane portion of said epoxyalkane and oxetane;
   said promoter ether being present in an amount such that a solid polymer is produced; and
   at a temperature of about −50° to +25° C. for a time such that a solid polymer product is produced.

26. A process in accordance with claim 25 wherein said promoter ether is ethylene oxide and said amount is not more than about 5 parts by weight per 100 parts of said furan.

27. A process in accordance with claim 25 wherein said promoter ether is propylene oxide and said amount is not more than about 3 parts by weight per 100 parts of said furan.

28. A process in accordance with claim 25 wherein said promoter ether is bischloromethyloxetane and said amount is not more than about 1 part by weight per part of said furan.

29. A solid linear polymer derived from a tetrahydrofuran and a saturated oxetane polymerized in the presence of silicon fluoride catalyst at a temperature not greater than about 50° C. and, said oxetane being present in the polymerization zone in an amount of about 5–25 parts by weight per 100 parts of said furan, characterized by an inherent viscosity of at least about 1, non-crystallinity viscous flow when subjected to prolonged stresses and elastic recovery from sudden stresses.

References Cited

UNITED STATES PATENTS

| 2,856,370 | 10/1958 | Muetterties | 260—20 X |
| 2,891,837 | 6/1959 | Campbell | 260—20 X |

OTHER REFERENCES

Polymerization of Aldehydes and Oxides, Furukawa et al., August 1963 (pp. 225–235 relied on), QD 281 P6F8 C2.

WILLIAM H. SHORT, *Primary Examiner.*

T. PERTILLA, *Assistant Examiner.*